United States Patent [19]
Hutchison

[11] B 4,003,581
[45] Jan. 18, 1977

[54] FIELD DRESSABLE INFLATABLE PACKER

[75] Inventor: Stanley O. Hutchison, Bakersfield, Calif.

[73] Assignee: Chevron Research Company, San Francisco, Calif.

[22] Filed: Jan. 2, 1974

[21] Appl. No.: 430,326

[44] Published under the second Trial Voluntary Protest Program on March 23, 1976 as document No. B 430,326.

Related U.S. Application Data

[63] Continuation-in-part of Ser. No. 367,602, June 6, 1973, and a continuation-in-part of Ser. No. 423,593, Dec. 10, 1973.

[52] U.S. Cl. .............................. 277/34.6; 277/185;
166/187; 138/177
[51] Int. Cl.² ...................................... F16J 15/46
[58] Field of Search ................. 277/34.6, 34, 185; 166/187; 138/177, 118

[56] References Cited
UNITED STATES PATENTS

| | | | |
|---|---|---|---|
| 820,149 | 5/1906 | Spang | 277/185 |
| 2,098,484 | 11/1937 | Brunred et al. | 166/187 |
| 2,334,788 | 11/1943 | O'Leary | 277/34.6 X |
| 2,611,437 | 9/1952 | Lynes | 166/187 X |
| 2,643,722 | 6/1953 | Lynes et al. | 166/187 X |
| 2,671,510 | 3/1954 | Slick et al. | 166/187 X |
| 2,778,432 | 1/1957 | Allen | 166/187 UX |
| 3,280,916 | 10/1966 | Barrington | 166/187 X |
| 3,598,126 | 8/1971 | Hoeltzenbein | 138/177 |
| 3,642,291 | 2/1972 | Zeffer | 277/34 |

*Primary Examiner*—Samuel B. Rothberg
*Attorney, Agent, or Firm*—R. L. Freeland, Jr.; E. J. Keeling

[57] ABSTRACT

A field dressable inflatable packer which includes a resilient inflatable sleeve formed of a rubber tube having a plurality of spaced-apart cord members extending longitudinally over the entire length of the tube and clamp means for disconnectably connecting the resilient sleeve in operable position over an inner tubing section which clamp means are constrained in position on the tubing string during operation of the packer but which may be removed for repair or replacement of the resilient sleeve.

3 Claims, 5 Drawing Figures

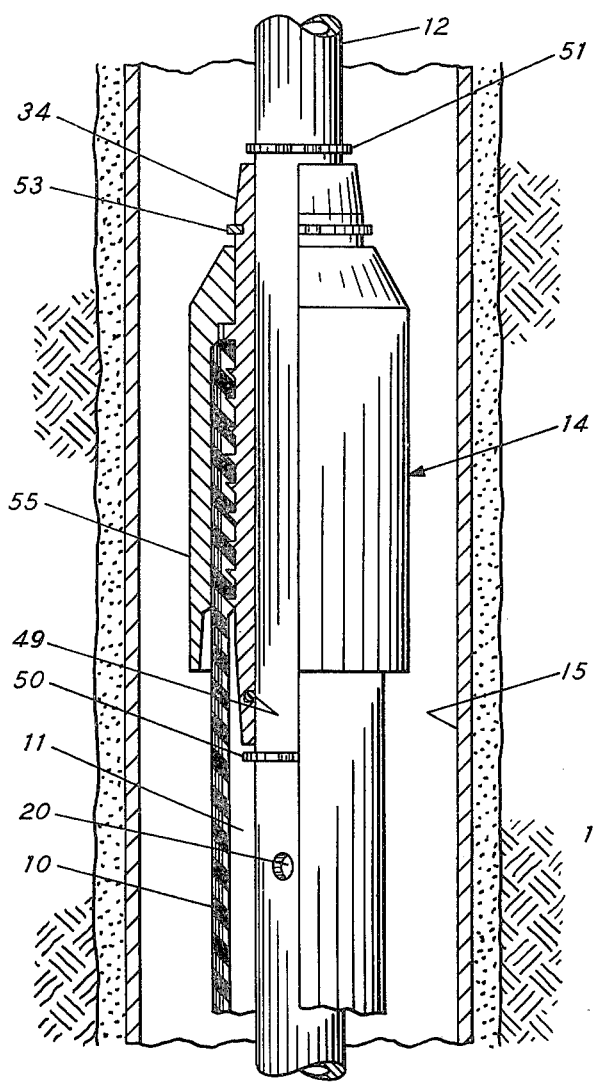
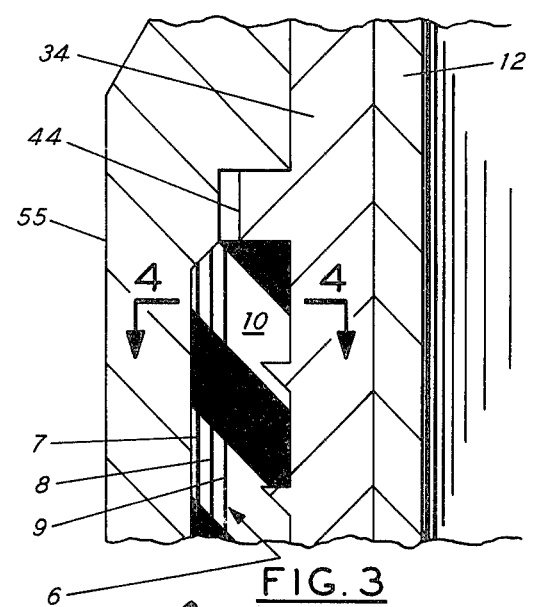
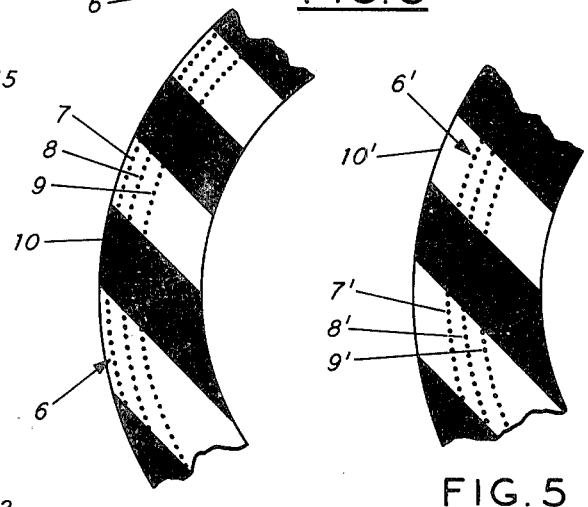
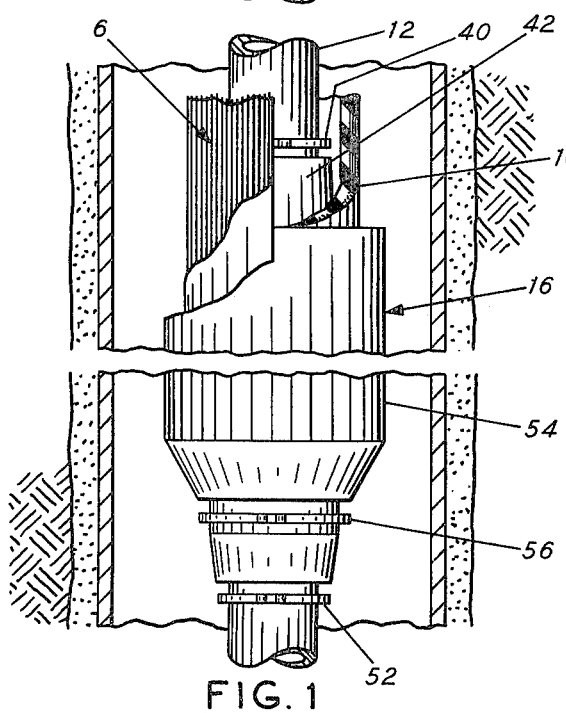
FIG. 1  FIG. 2  FIG. 3  FIG. 4  FIG. 5

FIELD DRESSABLE INFLATABLE PACKER

RELATED APPLICATIONS

This application is a continuation-in-part of U.S. applications Ser. No. 367,602, filed June 6, 1973 and Ser. No. 423,593, filed Dec. 10, 1973. The disclosure of these applications is hereby incorporated herein by reference.

BACKGROUND OF THE INVENTION

This invention relates to a field dressable inflatable packer for use in wells and, more particularly, this invention relates to a field dressable inflatable packer having a resilient inflatable sleeve element which contains longitudinally extending stretchable cord members. The resilient sleeve is connected over an inner tubular section of the packer by removable clamps for ease of assembly and disassembly of the packer under field conditions.

As is well known in the art, inflatable packers have many uses in well operations. There have been, of course, many different embodiments of inflatable packers known and used heretofore. An inflatable packer generally includes an inner tubing section and a resilient sleeve element carried by the tubing section for sealing engagement with a well wall, casing or liner. The resilient sleeve and the tubing section cooperate to form an annular chamber and the resilient sleeve is expanded by injecting fluid into this chamber. When so expanded, the sleeve can engage a well wall. When it is desired to remove the packer from a well, the sleeve is deflated and the packer may be pulled from the well. Repeated expansion and deflation can cause wear on a resilient sleeve. Wear is also caused by abrasion of the sleeve against the well wall. There is, therefore, need for a resilient sleeve which can withstand a number of inflation-deflation cycles and the abrasion which occurs when a packer is run into and out of a well. Further, there is need for an inflatable packer which may be "dressed" (i.e., the resilient sleeve being shorted or replaced) in the field.

BRIEF DESCRIPTION OF THE INVENTION

The present invention is directed to a field dressable inflatable packer. An elongated resilient sleeve element is positioned over an inner tubing section. The resilient sleeve and the tubing section cooperate to form an annular chamber. The resilient sleeve element comprises an elongated rubber tube having incorporated therein at least one circumferential layer formed of a plurality of spaced apart stretchable cord members extending longitudinally over the entire length of the rubber tube. Clamp means are slideably positioned on the tubing section and connect the ends of the sleeve element in fluid-tight relationship with the tubing section. The clamp means are retained in a predetermined position on the tubing section by removable constraining means. Port means are provided for injecting fluid into the annular chamber for inflating the sleeve element.

In preferred form, the rubber tube of the resilient element contains nylon cord members. The diameter of the cord members should be between 0.002 and 0.005 of an inch. Preferably there are three circumferential layers of spaced apart cord members incorporated in the rubber tube. Generally about 20 to 40 cord members per inch are contained in each circumferential layer. In highly preferred form 33 cord members per inch are contained in each circumferential layer.

OBJECTS OF THE INVENTION

The principal object of the present invention is to provide a field dressable inflatable packer having a longitudinally reinforced resilient sleeve element and removable, constrainable clamps for connecting the sleeve element to a tubing section. Further objects and advantages of the present invention will become apparent from the following detailed description read in light of the drawing which is a part of this specification.

BRIEF DESCRIPTION OF THE DRAWINGS

FIG. 1 is an elevation view with portions broken away for clarity of presentation and illustrates the preferred embodiment of apparatus assembled in accordance with the present invention in deflated condition;

FIG. 2 is an elevation view with portions broken away for clarity of presentation and illustrates the lower portion of apparatus assembled in accordance with the present invention in an inflated condition;

FIG. 3 is an enlarged sectional view illustrating the end of the resilient sleeve connected to the tubing;

FIG. 4 is a sectional view taken at line 4—4 of FIG. 3; and

FIG. 5 is a sectional view illustrating an alternative embodiment of the present invention.

DETAILED DESCRIPTION OF THE PREFERRED EMBODIMENT

The preferred arrangement of apparatus of the present invention will now be described in detail with reference to the drawing. The apparatus of the present invention provides an inflatable packer useful in well operations. The inflatable packer utilizes clamping means cooperating to disconnectably connect one end of an inflatable sleeve element to an interior tubing section. The resilient sleeve element fits over the tubing section which extends through the resilient sleeve member. A second clamping means is used to secure the other end of the resilient sleeve member on the tubing section. Removable constraining means are used to fix the position of the clamping means with respect to the tubing section during inflation and deflation of the resilient sleeve element. The resilient sleeve element is connected in fluid-tight relationship over the tubing section and cooperates therewith to form an annular chamber. Fluid is forced into this annular chamber between the inside of the resilient element and the outside of the tubing section to inflate the resilient sleeve element to sealingly engage the inside of a well.

In FIG. 1 an inflatable packer is illustrated in position inside of well casing 15. The casing 15 is used to line the wall of the well as is known in the art. An inflatable resilient sleeve member 10 is connected at its upper and lower ends in fluid-tight relationship to an elongated tubing section 12. The connection is made by clamping means indicated generally by the numerals 14 and 16. The upper end of the tubing section 12 is usually connected into a segmented tubing string which extends to the top of the well. If desired, however, the tubing section may be connected through an appropriate linkage system to a wireline. In this event, suitable inflation devices for inflating the inflatable element are run into the well with the tubing section on the wireline. When the tubing section is run into the well on a segmented tubing string, the resilient sleeve member 10 is inflated by flowing a fluid such as air or water down the interior of the tubing string into the tubing section and then through the tubing section through a suitable port or ports 20 therein provided.

The inflatable resilient sleeve element 10 of the packer comprises a longitudinally reinforced tube formed of rubber or a rubber-like material. The sleeve must be capable of being expanded and retracted numerous times. In preferred form, the resilient sleeve is formed by extruding a tube of rubber stock material of suitable diameter for the particular packer desired. Suitable longitudinally extending reinforcing, indicated generally by 6, is incorporated in the rubber sleeve. Physical properties of the rubber tube used in one suitable resilient sleeve were as follows: elongation 450% minimum; tensile strength 2500 No./in.$^2$; shore hardness 70; and tear 250 No./inch.

The inflatable sleeve element 10 of the packer is connected at its upper and lower ends in fluid-tight relationship by clamping means 14 and 16. The clamping means 14 and 16 disconnectably connect the resilient sleeve 10 in position over the tubing section 12. The disconnectable connection provided by the clamping means permits easy field repair or "dressing" of the packer. Thus, if the ends of the resilient sleeve 10 wear or abrade near the clamping means, then one or more of the clamping means are opened and the worn end or ends of the resilient sleeve trimmed off. The sleeve is then reconnected into the clamping means and the packer is again ready for use. During operation of the packer constraining means, such as retaining rings 51, 50, 40 and 52 are utilized to maintain the clamping means 14 and 16 in a substantially fixed position with respect to the tubing section 12. This is necessary to prevent undue wear or abrasion of the resilient sleeve during well operations. It is also necessary to prevent deformation of impression when the inflatable packer is used with an impression cover to obtain impressions in a well.

Clamping means useful in the present invention such as clamping means 14 include a mandrel section 34 which fits closely in sliding relationship over the tubing section 12. An O-ring 49 provides for a fluid-tight connection. The outside surface of the mandrel 34 has a number of annularly extending serrations. A force fit sleeve 55 cooperates to clamp the end of the resilient sleeve with the mandrel 34. Since the clamping means 14 is thereby slideable on the tubing section 12, it may be respositioned on the tubing section 12 to accommodate a resilient sleeve element 10 which has been shortened by field dressing. The clamping means 14 is constrained in a substantially fixed position on tubing section 12 during operation by suitable constraining means. Thus, retaining rings 50 and 51 are connected in selected grooves on the exterior of the tubing section 12 above and below the mandrel section 34 to limit the movement of the clamping means 14 on the tubing section. Retaining rings 52 and 40 limit movement of the lower clamping means 16 with respect to tubing section 12 in a similar manner. It is noted that the retaining rings 50, 51, 52 and 40 are easily snapped off and repositioned in other grooves located on the tubing section 12. Thus, if the resilient sleeve 10 is shortened during field dressing, the retaining rings 50 and 51 and/or 52 and 40 are disconnected and the mandrel and the clamping means are moved to a new position on the tubing section 12 and the retaining rings connected to grooves located at such location. In this regard, a series of grooves may be formed at convenient locations, for example, on nine inch centers, on the tubing section. In this manner, shortening of the resilient sleeve element may be done and retaining rings connected on the tubing in the preformed grooves to secure the clamping means holding the shortened resilient sleeve in place.

The elongated resilient sleeve element 10 is positioned over the tubing section 12 and forms an annular chamber 11 with the tubing section. The sleeve element comprises an elongated rubber tube having incorporated therein at least one circumferential layer formed of a plurality of spaced apart stretchable cord members as indicated generally by 6. The cord members extend longitudinally over the entire length of the rubber tube. In preferred form, the cord members are nylon and have a diameter of between 0.002 and 0.005 of an inch. As illustrated in FIG. 4, preferably three circumferential layers 7, 8, and 9 of cord members are incorporated in the body of the rubber tube. Generally, 20 to 40 cord members are contained per inch in each circumferential layer. In one embodiment, 33 cord members per inch in each circumferential layer was found suitable. The cord members extend the entire length of the tube. The cord members are integrated into the tube by virtue of being in the rubber tube while it is used.

The rubber tube, which with the cord members forms the resilient sleeve element of the present invention, is extruded utilizing a suitable rubber mix. A suitable uncured nitrile rubber is broken down and blended on a rubber processing mill. Certain additives are mixed with the rubber and a rubber tube is extruded from this mixture. The nylon cords which are skim-coated into a sheet of nitrile rubber are placed on the tube with the cords extending longitudinally down the tube. After the cords have been so positioned cotton tape is wrapped tightly over the cords and rubber tube. The rubber tube is then cured and the cord members are incorporated into the rubber tube. The tape is removed; then the resilient sleeve of the present invention is ready for use in an inflatable packer.

The preferred rubber mixture for the rubber tube of the resilient sleeve is set out below in Table 1.

TABLE I

| | |
|---|---|
| Nitrile Rubber (Goodyear Chemigum N-300) | 100.0 Parts |
| Zinc Oxide | 5.0 " |
| Stearic Acid | 1.0 " |
| Carbon Black (HAF Black) | 50.0 " |
| Cumar MH 2½$^1$ | 10.0 " |
| Di Butyl Phthalate | 10.0 " |
| Sulfur | 1.5 " |
| ALTAX$^2$ | 1.5 " |
| UNADS$^3$ | 0.20 " |

[1]Trademark of Allied Chemical Company for a neutral stable synthetic resin of the couraronc-indene type manufactured from selected distillates of tar.
[2]Trademark of Goodyear Rubber Company for benzothiazyl desulfide.
[3]Trademark of R. T. Vanderbilt Company for tetramethylthiuram monosulfide.

The cure conditions and physical properties of the tube are set out below in Table II.

TABLE II

| | |
|---|---|
| Best Cure | 4 hrs. at 280°F |
| Elongation | 525% - 450% Minimum |
| Tensile Strength | 2700 Psi - 2500 Psi Minimum |
| Tear Strength Die "C" | 250 Psi - 200 Psi Minimum |
| Shore "A" Hardness | 70 ± 5 |

The rubber mixture is formed by breaking down the nitrile rubber and blending the mix ingredients on a rubber processing mill until smooth and heated to working temperatures. The rubber mixture is then cut into strips and fed into an extruding unit equipped with dies to extrude a rubber tube with a suitable interior diameter and wall thickness. A large packer might have, for example, an interior diameter of 3.750 inches and a wall thickness of 0.210 ± 0.030 inches. A small packer might have an interior diameter of 2.375 inches with a wall thickness of 0.100 ± 0.030 inches.

The tube is extruded to the desired length - such as 30 feet or more - and passed through a water bath to cool it and maintain size specification. After cooling the tube is slipped over an appropriate smooth mandrel, either 3.750 inches OD or 2.375 inches OD depending on the tube size. The mandrel is connected to a slow speed rotating motor on one end and bearing support at the other end. The nylon cord reinforcing material comes in rolls consisting of nylon cords 0.030 in. in diameter spaced 33 per inch running lengthwise. The cords are skim-coated into a sheet with an uncured nitrile rubber of a thickness of 0.050 inch. A suitable nitrile rubber skim coat is Master Process X-1676-1 Hycak. Continuous strips 1-inch wider than the circumference of the rubber tube are cut to correspond to the length of rubber tube. These strips are laid lengthwise on the rubber tube and wrapped around to overlap approximately 1 inch. After smoothing and pressing firmly the nantural adhesion between the clean rubber surfaces of the tube and the skim coat holds the skim coat sheet in place. A second layer of nylon cord reinforcing sheet is cut and laid in where the first wrap ended and wrapped and overlapped 1 inch. A third strip is cut approximately 1 inch less than the circumference of the 2-layer wrapped tube. This strip is laid along the edge of the second layer and wrapped around to end along the backside of lap number 2. After all three nylon cord layers are wrapped and smoothed out the mandrel and tube is rotated slowly and tightly spiral wrapped with 2 inch-wide cotton tape to press the layers together firmly and to prevent expansion while curing. The mandrel, tube and wrappings are all enclosed in a 35 foot long steam chamber and cured for 4 hours at 50 Psi steam pressure (280°F). The curing unites the rubber sheets and the rubber tube into a single rubber tube with the cords incorporated therein.

After curing and cooling the mandrel and rubber tube containing the nylon cords are removed from the steam chest and the cotton tape is removed. The tube is slipped off the mandrel and forms the resilient element of the present invention.

As shown in FIG. 4, the layers of stretchable nylon cords 7, 8, and 9 are incorporated into the outer half of the wall of the rubber tube. This is the preferred arrangement when an impression sheet is to be added to the tube. In FIG. 5 the cord members 7', 8' and 9' are incorporated towards the center of the wall. This construction is preferred when the tube is to be used without an outer covering.

The inflatable packer of the present invention is readily assembled or field dressed. The tubing section 12 is placed in a suitable position to receive the inflatable resilient sleeve element 10. One end of the resilient sleeve 10 is trimmed and beveled on the exterior surface as shown in FIG. 3. The cord members 7, 8, and 9 extend completely to the end of the sleeve. The resilient sleeve element 10 is slid over the tubing section 12 and an inside retaining ring 50 is snapped into a groove at a desired location on the tubing section 12. The mandrel section 34 is slipped over the end of the tubing section 12 and moved to contact retaining ring 50. An outer retaining ring 51 is then installed in a groove in tubing section 12 on the other side of the mandrel 34. The resilient sleeve element 10 is then slipped over the outside of the mandrel 34 and is butted against a flange formed on the upper exterior portion of the mandrel 34. The other end of the resilient sleeve member including the cords contained therein is cut to a predetermined length and is beveled for connection into the other clamping means 16. The retaining ring 51 on the other end of tubing section 12 is removed and the mandrel section 34 and the resilient sleeve element 10 are moved up the tubing section 12 to expose a groove for the inside retaining ring 40 of clamping means 16. A retaining ring 40 is installed in this groove and a mandrel section 42 is slipped over the lower end of tubing section 12 in contact with this retaining ring 40. An outside retaining ring 52 is then positioned in a groove on the tubing section 12 on the other side of the mandrel 42. The resilient sleeve 10 and the upper mandrel 34 are then moved down the tubing section 12 to permit the other end of the resilient sleeve element 10 to be forced over the outer portion of the lower mandrel 42. Forced fit sleeves 55 and 54 are placed over the tubing section 12 in position to be installed over the ends of the resilient sleeve 10. The forced fit sleeves 55 and 54 are forced over the resilient sleeve member 10 by suitable means such as a hydraulic jack. After the forced fit sleeves 55 and 54 are in position, the outside retaining rings 53 and 51 of clamp means 14 and similar rings 56 and 52 of clamp means 16 are installed and the packer is ready to be run.

The inflatable packer is also readily dressed in the field if needed. If, for example, a portion of the inflatable resilient sleeve element 10 were damaged near the clamping means indicated generally as 14, field repair of the packer is readily accomplished. The retaining ring 53 positioned in a groove on mandrel section 34 is removed and the force fit sleeve 55 is removed from the mandrel section 34. The damaged portion of the resilient sleeve element 10 including the cord members 7, 8 and 9 contained therein is cut off by suitable means. The cut is located so that it removes the damaged portion of the sleeve element 10 and so that the shortened sleeve element 10 is in proper location with respect to other retaining ring grooves located on the tubing section 12. In accordance with the invention the cord members are contained in the rubber because they were incorporated there during the cure. Thus, the tube can be shortened and the cord members will still perform their function. The retaining ring 52 on the clamping means 16 located at the other end of the tubing section is removed and the resilient sleeve element 10 and the clamping means indicated generally by 16 are moved to expose a new retaining ring groove for the clamping means 14 on the other end of the tubing section 12. A retaining ring is connected into this exposed groove and the mandrel 34 is moved in position adjacent this ring. A retaining ring is snapped into a groove on tubing section 12 above the mandrel 34 in this new position. The resilient sleeve member 10 is then moved over the mandrel 34 to a position abutting the flange of the mandrel. The force fit sleeve 55 is then forced over the end of the resilient sleeve member 10 to reconnect the resilient sleeve member. Retaining ring 53 is replaced to locate the force fit sleeve in place. A retaining ring is positioned at the other end of the packer to retain clamp means 16 and thus complete the connection.

Thus, in summary the present invention provides a field dressable inflatable packer. The packer includes an elongated resilient sleeve element positioned over an inner tubing section to form an annular chamber. The resilient sleeve element comprises an elongated rubber tube having incorporated therein at least one circumferential layer formed of a plurality of spaced apart stretchable cord members extending longitudinally over the entire length of the rubber tube. Clamp means are slideably positioned on the tubing section and connect the ends of the sleeve element in fluid-tight relationship with the tubing section. The clamp means are retained in a predetermined position on the tubing section by removable constraining means. Port means are provided for injecting fluid into the annular chamber for inflating the sleeve element.

Although certain preferred embodiments of the present invention have been herein described in order to provide an example of its construction and steps sufficient for usage by those skilled in the art, it is to be understood that various changes and innovations in the structure described can be effected without departure from the basic principles of the invention. Changes and revisions of this sort which continue to rely on these principles are therefore deemed to be circumscribed by the spirit and scope of the appended claims.

I claim:

1. A field dressable inflatable packer comprising an inner tubing section, an elongated resilient sleeve element positioned over said tubing section and forming an annular chamber with said tubing section, said sleeve element comprising an elongated cured rubber tube having incorporated by curing therein at least one circumferential layer formed of from 20 to 40 per inch spaced apart stretchable nylon cord members having a diameter between about 0.002 and 0.005 of an inch and extending only longitudinally over the entire length of said rubber tube and in substantially parallel relationship with the longitudinal axis of said rubber tube and further characterized by the absence of any such cord member in said rubber tube transverse to said longitudinal axis of said rubber tube, clamp means slideably positioned on said tubing section connecting the ends of said sleeve element in fluidtight relationship with said tubing section, removable constraining means for constraining said clamp means in a predeterminable position on said tubing section and port means in said tubing section for injecting fluid into said annular chamber for inflating said sleeve element.

2. The packer of claim 1 further characterized in that three circumferential layers of cord members are incorporated in said rubber tube.

3. The packer of claim 2 further characterized by 33 cord members per inch in each circumferential layer.

* * * * *